United States Patent [19]

Kikuchi

[11] Patent Number: 5,533,095
[45] Date of Patent: Jul. 2, 1996

[54] DATA TRANSFER SYSTEM

[75] Inventor: Hirofumi Kikuchi, Tokyo, Japan

[73] Assignee: NEC Corporation, Tokyo, Japan

[21] Appl. No.: 137,266

[22] Filed: Oct. 18, 1993

[30] Foreign Application Priority Data

Oct. 21, 1992 [JP] Japan .................................. 4-282621

[51] Int. Cl.$^6$ ..................................... H04Q 7/10
[52] U.S. Cl. ........................ 379/57; 340/311.1
[58] Field of Search .................. 379/56, 52, 58; 340/825.44, 311.1

[56] References Cited

U.S. PATENT DOCUMENTS

| 4,868,560 | 9/1989 | Oliwa et al. | 379/56 |
| 5,289,524 | 2/1994 | Takano et al. | 379/57 |
| 5,315,635 | 5/1994 | Kane et al. | 379/57 |

FOREIGN PATENT DOCUMENTS

| 58-221527 | 4/1984 | Japan . | |
| 0296846 | 11/1989 | Japan | 379/57 |
| WO86/03645 | 6/1986 | WIPO . | |

Primary Examiner—Curtis Kuntz
Assistant Examiner—William G. Trost
Attorney, Agent, or Firm—Young & Thompson

[57] ABSTRACT

A data transfer system capable of preventing a transmitter from receiving erroneous message data because of an instantaneous interruption of a transmission line. The radio paging terminal includes a message data transmission circuit for transmitting inputted message data through a transmission line. The transmitter, which is connected to the transmission line, receives an output signal from the message data transmission circuit via the transmission line and outputs the output signal to a modulator section and a transmitter section which transmits the message data as radio waves for data transfer with the radio paging terminal. The transmitter also includes a receiver for receiving the radio waves radiated from the transmitter section and for outputting the demodulated message data to the radio paging terminal. The radio paging terminal also includes a message data receiving circuit for receiving the message data outputted from the receiver, a comparator circuit for comparing the received message data with the message data transmitted by the message data transmission circuit, and a message data output circuit for outputting the message data found to be different as a result of the comparison.

4 Claims, 2 Drawing Sheets

DATA TRANSFER SYSTEM

BACKGROUND OF THE INVENTION

1. Field of the Invention

The present invention relates to a data transfer system, and more specifically to a data transfer system capable of confirmation of data transfer between a paging terminal and a transmitter, both being interconnected with each other through a transmission line.

2. Description of the Related Art

Wide use is made of a selective call radio equipment called a "pocket bell", a so-called pager. When it is desired to call a person carrying such a pager, a telephone number peculiar to the pager is dialed, so that there comes a ringing of a calling sound or display of a simple message on a display window of the pager.

In prior practice of a data transfer system of a pager of the type described above, a radio paging terminal 21 includes a message data transmission circuit 1A, and a transmitter 20 includes a message data modulator section 2 and a transmitter section 3, the radio paging terminal 21 and the transmitter 20 being interconnected with each other through a transmission line 9. Message data received by the transmitter 20 is modulated by the message data modulator section 2, and is finally sent from the transmitter section 3 through an antenna 12. There is however no confirmation means to confirm whether or not the message data transmitted from 1A is correctly tranmitted in the form of radio waves.

The prior art data transfer system has such difficulty as described above because it includes no means to confirm whether or not the message data transmitted from the radio paging terminal is correctly received by the transmitter and hence it includes no means to correctly grasp the details of the preferred message data without improving the reliability of data transfer.

SUMMARY OF THE INVENTION

To solve the difficulty with the prior art, it is an object of the present invention to provide a data transmission system capable of confirming that any message data is securely transmitted.

To achieve the above object, a data transfer system according to the present invention comprises:

a radio paging terminal including a message data transmission circuit for transmitting message data inputted by a calling party onto a transmission line; and a transmitter for receiving an output signal from said message data transmission circuit through said transmission line and radiating radio waves through a modulator section and a transmitter section, said transmitter transferring data with said radio paging terminal;

said transmitter also including a receiver for receiving the radio waves radiated from the transmitter section and delivering demodulated message data;

said radio paging terminal further comprising:

a message data receiving circuit for receiving by return the message data sent from said receiver;

a comparator circuit for comparing the message data received by said message data receiving circuit with message data transmitted by said massage data transmission circuit, a message data output circuit for outputting the same message data as those transmitted from said message data transmission circuit when the message data received by said message data receiving circuit is found to be different from the message data transmitted by said message data transmission circuit as a result of the comparison to a printer or the like; and a feedback circuit for receiving, when the compared message data are different, correct message data from the comparator circuit and reversely converting said data to the same message data as that inputted by said calling party to again input the converted data into said message data transmission circuit for retransmitting the correct message data to said transmitter.

BRIEF DESCRIPTION OF THE DRAWINGS

The above and other objects, features and advantages of the present invention will be better understood from reading the following description of the preferred embodiment taken in connection with the accompanying drawings in which.

DETAILED DESCRIPTION OF THE PREFERRED EMBODIMENT

In what follows, a preferred embodiment of the present invention will be described with reference to the accompanying drawings.

Figure 1:
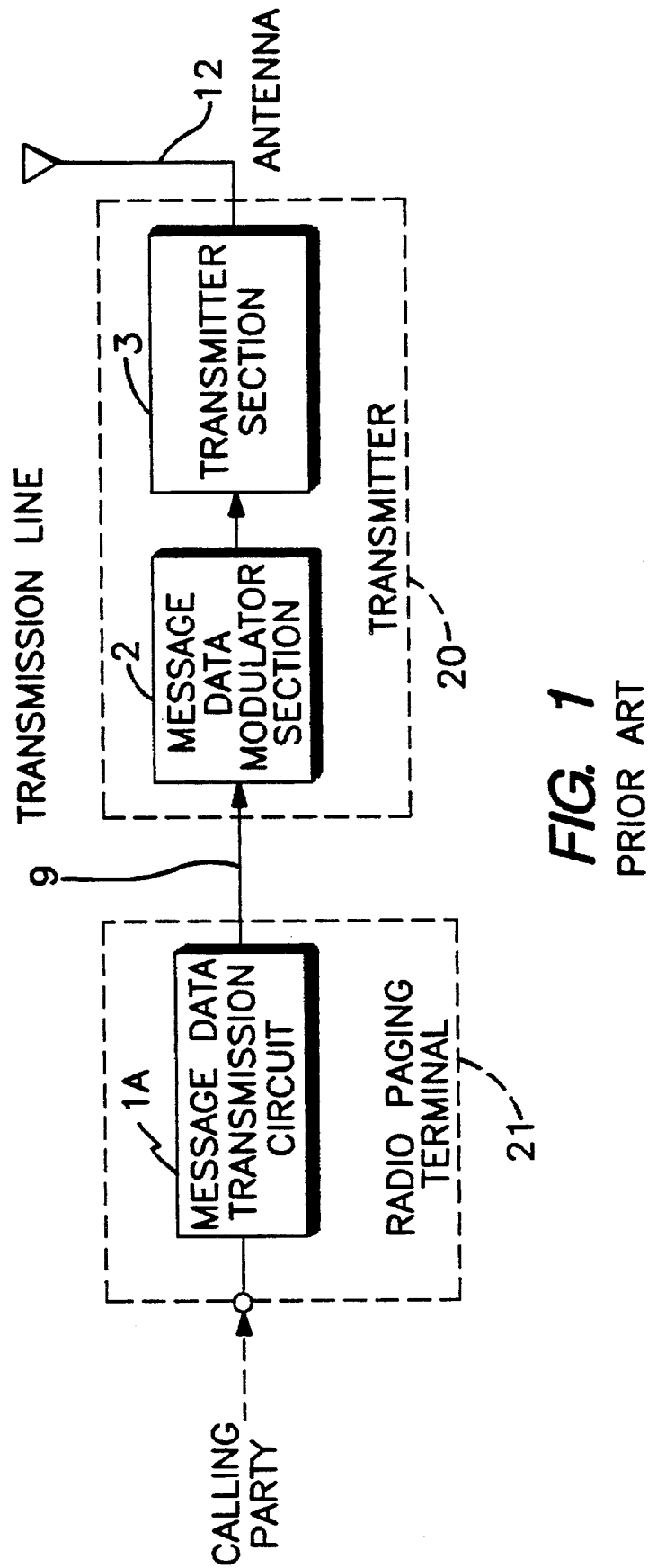
FIG. 1 is a block diagram illustrating a prior art data transfer system.
Figure 2:
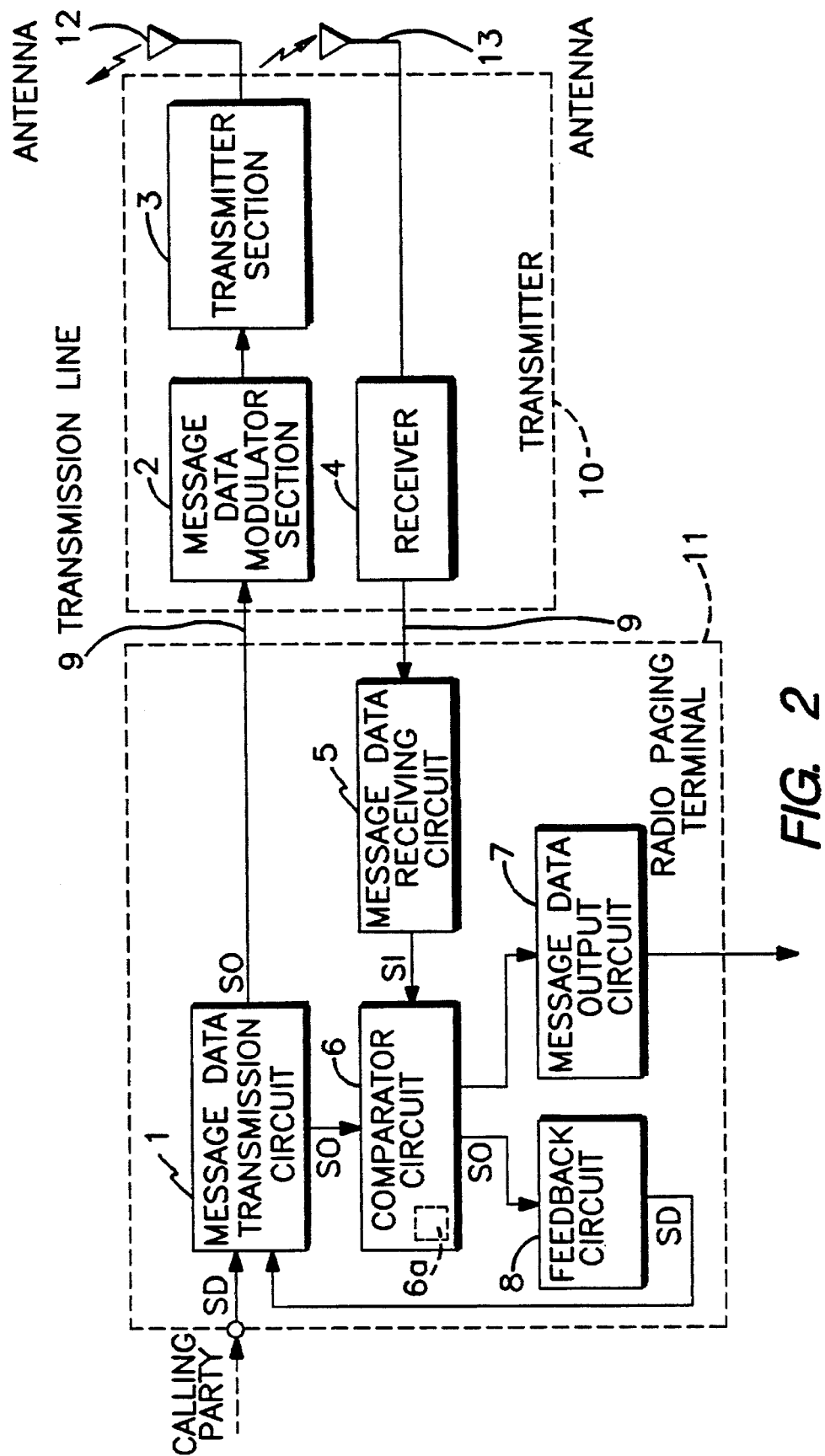
FIG. 2 is a block diagram illustrating a data transfer system according to an embodiment of the present invention.

Referring to FIG. 2, there is illustrated a block diagram of the preferred embodiment according to the present invention.

As illustrated in FIG. 2, massage data SD inputted from a calling party into radio paging terminal 11 enters a message data tramsmission circuit 1 where it is encoded, and thereafter it is transmitted onto a transmission line 9 as message data SO as well as to a comparator circuit 6 described later. A transmitter 10 allows a message data modulator section 2 therein to receive the message data SO entered through the transmission line 9 and modulate the data SO into a modulation signal. The modulation signal is transferred to a transmitter section 3 which transmits the modulation signal as radio waves. The radio waves are radiated from an antenna 12 and sent to a paging receiver while being received by a receiver 4 via an antenna 13 and being thereafter retransmitted by return to a message data receiving circuit 5 in the radio paging terminal 11. The message data SO fed to the comparator circuit 6 is stored in a memory 6a in the comparator circuit 6. The message data SI from the message data receiving circuit 5 is fed to the comparator circuit 6. The comprator circuit 6 compares the message data SI with the message data SO which is stored in the memory 6a. As a result of the comparison, if both message data SO and SI are different from each other, the comparator circuit 6 issues a data signal to a message data output circuit 7 which means that both message data are different while transmitting the correct message data SO stored in the memory 6a to a feedback circuit 8, where the message data SO is reversely converted to the same message data SD inputted by the calling party. The message data SD so converted is again entered into the message data transmission circuit 1 for transmission of the same to the transmitter 10 as retransmission data. An output from the message data output circuit 7 is transmitted to a printer for registration thereof.

According to the present invention, as described above, there are provided in the transmitter a receiver for receiving a signal once transmitted from the transmitter in the form of radio waves and feeding it back to the radio paging terminal. A comparator circuit compares the fed-back message data SI with message data SO which is stored in a memory. Thereby, retransmission processing of the message data is ensured, and hence erroneous operation on the side of the transmitter owing to instantaneous interruption of the transmission line is prevented so that the reliability of the data transfer is improved.

What is claimed is:

1. A data transfer system comprising:
   a radio paging terminal including a message data transmission circuit for transmitting message data inputted by a calling party to a transmission line; and
   a transmitter whose input is connected to said transmission line, said transmitter comprising a modulator section for modulating said message data input to said transmission line and a transmitter section connected to said modulator section for transmitting said modulated message data;
   said transmitter further including:
     a receiver within said transmitter for simultaneously receiving radio waves radiated from said transmitter section and for demodulating said received radio waves as received message data, an output of said receiver being connected to said radio paging terminal;
   said radio paging terminal further comprising:
     a message data receiving circuit whose input is connected to said output of said receiver for receiving said message data received by said receiver;
     a comparator circuit for comparing said received message data with the message data transmitted by said message data transmission circuit;
     a message data output circuit for outputting a message data found to be different from said transmitted message data as a result of the comparison; and
     a feedback circuit for feeding the message data back to said message data transmission circuit for retransmission of said message data to said transmitter when said comparator determines that there is a difference between the message data received from said message data receiving circuit and the message data transmitted from said message data transmission circuit.

2. A data transfer system according to claim 1, wherein said transmitter further includes an antenna connected to said receiver for receiving the radio waves radiated from said transmitter section, the signal received by said antenna being supplied to said receiver.

3. A data transfer system comprising:
   a radio paging terminal including a message data transmission circuit for transmitting message data inputted by a calling party to a transmission line; and
   a transmitter whose input is connected to said transmission line, said transmitter comprising a modulator section for modulating said message data input to said transmission line and a transmitter section connected to said modulator section for transmitting said modulated message data;
   said transmitter further including:
     a receiver within said transmitter for simultaneously receiving radio waves radiated from said transmitter section and for demodulating said received radio waves as received message data, an output of said receiver being connected to said radio paging terminal;
   said radio paging terminal further comprising:
     a message data receiving circuit whose input is connected to said output of said receiver for receiving the message data received by said receiver;
     a comparator circuit for comparing the received message data with the message data transmitted by said message data transmission circuit; and
     a feedback circuit connected to said comparator circuit for feeding the message data back to said message data transmission circuit for retransmission of said message data to said transmitter when said comparator determines that there is a difference between the message data received from said message data receiving circuit and the message data transmitted from said message data transmission circuit.

4. A data transfer system according to claim 3, wherein said transmitter further includes an antenna connected to said receiver for receiving the radio waves radiated from said transmitter section, the signal received by said antenna being supplied to said receiver.

* * * * *